United States Patent
Berry et al.

(10) Patent No.: US 6,571,472 B2
(45) Date of Patent: Jun. 3, 2003

(54) RESTORATION OF THICKNESS TO LOAD-BEARING GAS TURBINE ENGINE COMPONENTS

(75) Inventors: Thomas Frederic Berry, Central Lake, MI (US); Michael James Weimer, Loveland, OH (US); David Edwin Budinger, Loveland, OH (US); David John Dietz, Loveland, OH (US); Mark Daniel Gorman, West Chester, OH (US); Matthew Stewart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/929,185

(22) Filed: Aug. 14, 2001

(65) Prior Publication Data

US 2003/0033702 A1 Feb. 20, 2003

(51) Int. Cl.⁷ ................................................. B23P 15/00
(52) U.S. Cl. .................. 29/889.1; 29/889.2; 29/402.18; 427/455
(58) Field of Search ................. 29/889.1, 889.2, 29/402.03, 402.06, 402.18; 427/455, 456, 446

(56) References Cited

U.S. PATENT DOCUMENTS

| 4,893,388 A | | 1/1990 | Amos et al. |
|---|---|---|---|
| 5,448,828 A | | 9/1995 | Willems et al. |
| 5,813,118 A | * | 9/1998 | Roedl et al. ................ 29/889.1 |
| 5,956,845 A | | 9/1999 | Arnold |
| 5,972,424 A | | 10/1999 | Draghi et al. |
| 6,049,978 A | | 4/2000 | Arnold |
| 6,146,692 A | * | 11/2000 | Sangeeta et al. ........... 29/889.1 |
| 6,158,963 A | * | 12/2000 | Hollis et al. ............ 416/219 R |
| 6,199,276 B1 | | 3/2001 | Siebert et al. |
| 6,233,822 B1 | * | 5/2001 | Grossklaus, Jr. et al. .. 29/889.1 |
| 6,243,948 B1 | * | 6/2001 | Lee et al. ................. 29/889.05 |
| 6,345,441 B1 | * | 2/2002 | Farmer et al. ........... 29/402.13 |
| 6,380,512 B1 | * | 4/2002 | Emer ..................... 219/121.71 |
| 6,461,108 B1 | * | 10/2002 | Lee et al. ................. 416/96 R |
| 6,468,040 B1 | * | 10/2002 | Grylls et al. ................ 416/224 |
| 6,502,304 B2 | * | 1/2003 | Rigney et al. ........... 29/889.21 |
| 2002/0098294 A1 | * | 7/2002 | Lau et al. .................... 427/454 |
| 2002/0172837 A1 | * | 11/2002 | Allen et al. ................. 428/632 |
| 2002/0197502 A1 | * | 12/2002 | Zhao et al. ................. 428/632 |

* cited by examiner

*Primary Examiner*—Icuda Rosenbaum
(74) *Attorney, Agent, or Firm*—David L. Narciso; Senniger, Powers, Leavitt & Roedel

(57) ABSTRACT

A method for restoring thickness to load-bearing components of gas turbine engines, and for repairing a honeycomb structured gas turbine engine component. A surface of the component such as the backing surface of a honeycomb component after honeycomb removal is roughened and cleaned. A selected build-up material is deposited onto the substrate by high velocity oxy-fuel deposition or low pressure plasma spray. The component is heat treated to enhance the bond between the deposited material particles, and between the deposited material and the substrate by diffusion.

22 Claims, 3 Drawing Sheets

RESTORATION OF THICKNESS TO LOAD-BEARING GAS TURBINE ENGINE COMPONENTS

BACKGROUND OF THE INVENTION

This invention relates to the repair of gas turbine engine components and, more particularly, to a method for depositing material to increase the thickness of load-bearing components in gas turbine engines, including honeycomb backing material such as in compressor discharge pressure (CDP) seals, forward inner nozzle supports, aft seals, and others.

The honeycomb in aircraft engine seals is replaced essentially every time an engine is torn down to permit re-grinding the diameters to restore seal clearances and aid in engine efficiency retention. The honeycomb is removed by a variety of methods, including air hammer chiseling, machining, grinding, chemical etching, and other methods. The honeycomb backing is typically thin, on the order of less than about 0.1 inch (0.25 cm), and often becomes distorted due to stresses encountered in service. Honeycomb removal, no matter how carefully conducted, gradually thins the backing as the honeycomb is removed multiple times during multiple repairs. Eventually, the backing is too thin to be serviceable, rendering the entire component scrap. While backing thinned to about 20% below the new part minimum thickness is acceptable for service, backing thinned further is not acceptable for service, as increased service stresses tend to cause cracking. Typical backing materials are IN718, IN625, Hastelloy X, René 41, Waspaloy, IN903, IN907, IN909, and others. There has been a need for a cost effective, low distortion process for rebuilding material thickness on backings which yields acceptable mechanical properties in the build up material as well as in the joint between the build up material and the substrate, to permit salvage of scrapped or otherwise unuseable components.

Conventional salvage methods to add thickness to backing, such as welding, generally produce excessive distortion because the backing is thin. Such welding processes can produce acceptable bond strengths and added material strengths, but have not been successful to date because of distortion. Low heat input TIG welding and laser welding have been attempted, but excessive distortion remains a problem. Conventional thermal sprays can restore the backing thickness, but bond strength and added material strength is too low, typically on the order of only 10% of the backing material strength. This characteristic effectively limits use of conventional thermal spray to applications in compression.

A high velocity oxy-fuel (HVOF) process has been developed to apply CoNiCrAlY material to the flow path of relatively non load-bearing investment cast Ni-based (such as IN738) and Co-based (such as MarM509) turbine shrouds, such as high pressure turbine (HPT) shrouds. In such shrouds the segment length is short, in-service bending is low, resistance to hot gas corrosion and resistance to high temperatures are required, and mechanical strength and grain growth are not issues. In connection with this process for turbine shrouds, adequate bond strengths have been achieved by the use of a high temperature diffusion.

SUMMARY OF THE INVENTION

Briefly, therefore, the invention is directed to a method for restoring thickness of gas turbine engine components such as seals having honeycomb structure on a backing substrate, flanges or casing pockets. A build-up material is deposited onto the backing substrate by a method selected from high velocity oxy-fuel deposition and low pressure plasma spray deposition.

The invention is also directed to a method for repairing a gas turbine engine component comprising a honeycomb structure on a backing substrate. Honeycomb structure is removed from the backing substrate; the backing substrate is roughened and cleaned. A selected build-up material is deposited onto the backing substrate by a method selected from high velocity oxy-fuel deposition and low pressure plasma spray. The backing substrate is heat treated to diffuse deposited build-up material into the substrate, enhance bond strength between deposited build-up material and the substrate, and enhance the bond strength between build-up material particles.

In another aspect, the invention is a method for repairing a gas turbine engine component comprising honeycomb structure on a backing substrate. Honeycomb structure is removed from the backing substrate. A build-up material comprising from about 4 to about 8 wt % Al, from about 15 to about 22 wt % Cr, and balance Ni is deposited onto the backing substrate by a method selected from high velocity oxy-fuel deposition and low pressure plasma spray. The substrate is heat treated to diffuse deposited build-up material into the substrate, enhance bond strength between deposited build-up material and the substrate, and enhance the bond strength between build-up material particles.

The invention is further directed to a method for repairing a gas turbine engine component comprising honeycomb structure on a backing substrate in which a build-up material is deposited onto the substrate by high velocity oxy-fuel deposition employing a fuel-to-oxygen ratio which produces a reducing deposition atmosphere thereby reducing oxidation of build-up material during deposition.

The invention is further directed to a method for restoring thickness to a load-bearing gas turbine engine component. A surface of the component is mechanically roughened to produce a roughened surface. The roughened surface is cleaned to remove residue remaining from the mechanical roughening. A build-up material is deposited onto the roughened surface by a method selected from high velocity oxy-fuel deposition and low pressure plasma spray. The backing substrate is heat treated to diffuse deposited build-up material into the substrate, enhance bond strength between deposited build-up material and the substrate, and enhance the bond strength between build-up material particles.

Other objects and other features will be in part apparent and in part pointed out hereinafter.

DETAILED DESCRIPTION OF THE INVENTION

Figure 1:
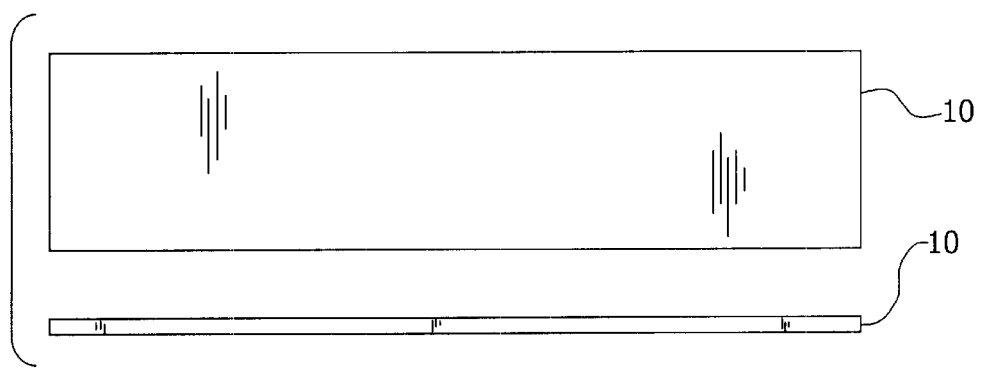
FIGS. 1–4 are schematics of test specimens used to evaluate the invention.

In accordance with this invention the honeycomb structure of load-bearing gas turbine engine components for repair such as CDP seals, forward inner nozzle supports, and aft seals is removed by air hammer chiseling, machining, grinding, chemical etching, or other suitable method.

After removal of the honeycomb structure, the backing component substrate is subjected to a specialized surface cleaning process involving grit blasting with alumina or the like to roughen the surface to increase surface area and enhance mechanical interlocking-type bonding between the eventually deposited metal and the substrate. While this mechanical surface treatment enhances mechanical bonding, the later described heat treatment enhances chemical bonding. The grit blasting leaves a substantial amount of residual oxide particles, alumina in particular, embedded in the substrate surface. This oxide interferes with bonding. Because the bond between the build-up material and the substrate is important in load-bearing applications such as seals and supports, this oxide should be removed. Therefore, after mechanical treatment, the roughened surface can be cleaned using a high pressure water jet to sufficiently remove embedded grit, oxides, dirt, or surface material which may inhibit bonding of the deposited material to the substrate. This particular treatment is controlled to remove the oxide, but is not carried out with such force or for sufficient time to impart significant polishing, as this would defeat the roughening effect. In a preferred embodiment, cleaning is such that substantially all embedded oxides of the blasting media are removed to facilitate bonding; for example, such that less than about 10% of the surface area contains embedded oxides. High pressure water jet parameters are adjusted to achieve cleaning below this maximum level of embedded grit and other surface contaminants, but do not adversely affect the surface roughness or material thickness. The specific high pressure water jet parameters employed vary based on the equipment used. An exemplary seal backing after treatment as described above is on the order of 0.050 inches (0.13 cm) thick. Alternately, high pressure water jet parameters can be adjusted to roughen the surface, eliminating the need for grit blasting.

After surface preparation, the component is subjected to an HVOF process to build up the backing material. An HVOF process would not have been selected for this application based on prior experience with such processes because HVOF build-up materials typically have a high oxide content which detracts from bond strength. These oxides are formed because the metal to be deposited is carried in a stream containing oxygen and fuel. The expected normal HVOF deposit bond strengths, while adequate for non load-bearing applications, are not sufficient for high-load-bearing applications such as seals. The current invention, however, has rendered HVOF suitable for such applications due to its selection criteria for the material to be deposited and HVOF parameters employed. Some considerations are powder chemistry, size, and method of manufacture. For example, high strength powders such as René 80 are not preferred due to their elevated refractory metal contents that can preferentially oxidize during HVOF deposition. In addition, the reduced ductility of high strength powders such as René 80 limits their effectiveness in this application due to their inability to tolerate strain after deposition and heat treatment. The preferred material, therefore, is relatively ductile. Furthermore, its chemistry is such in relation to the substrate chemistry so as to establish a diffusion couple with the substrate.

The powder material to be deposited is injected into the HVOF jet stream and accelerated toward the substrate at high velocity. The HVOF process utilizes the continuous internal combustion of oxygen and a fuel gas to produce a hot, high velocity exhaust jet stream. Inasmuch as the substrate in certain seals is an arcuate segment of significant length, on the order of 10 degrees up to 360 degrees, special care is taken to avoid significant distortion. In one aspect distortion is minimized due to the inherent low substrate temperature of the HVOF process as compared to welding processes which involve significant heating of the substrate. Further, it is important to adjust the HVOF parameters such as gas flow rates, stand-off distance, and powder flow rates to minimize the porosity and residual stress of the deposit, thus further minimizing distortion. Also, during service the backing is subjected to a variety of loading conditions, including tensile, stress rupture, creep, high cycle fatigue, and low cycle fatigue. The HVOF deposit is controlled, especially in density and oxide content, to achieve the required mechanical properties. Fine grain size is inherent in the material in its as-deposited condition.

The ratio of fuel to oxygen, typically hydrogen to oxygen, can be at least about 2.5 to 1 (2.5:1). In one embodiment, the ratio is maintained from about 2.5 to 1 to about 4 to 1. This helps avoid oxidation of the powder to be deposited during deposition. This is a higher ratio of hydrogen to oxygen than in typical HVOF processes, and advantageously promotes a reducing atmosphere.

Post deposition heat treatment is performed to enhance both interparticle bonding and substrate-to-coating bonding, and to increase ductility of the applied coating. Times and temperatures are selected to provide favorable diffusion characteristics while maintaining substrate metallurgical integrity.

Figure 2:
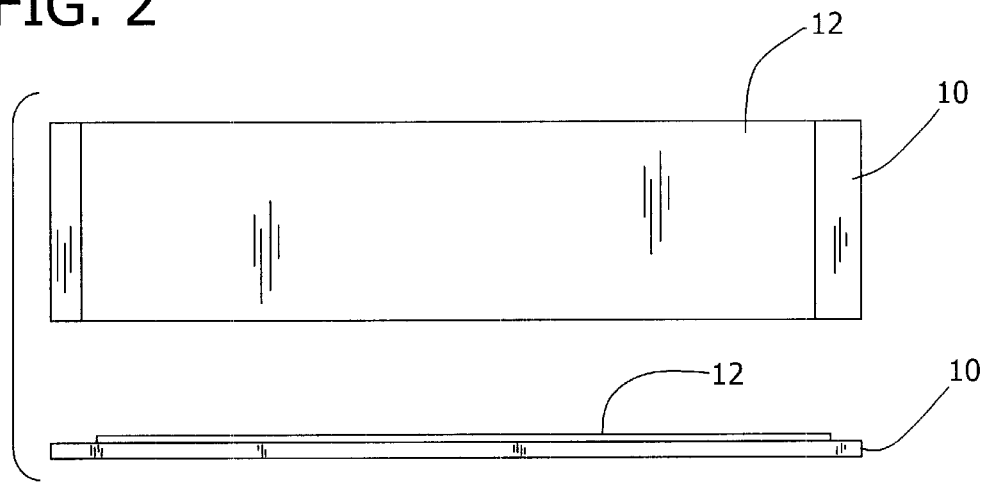
Figure 3:
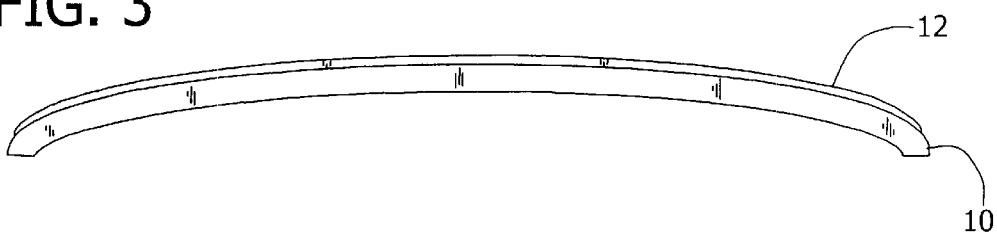
Figure 4:
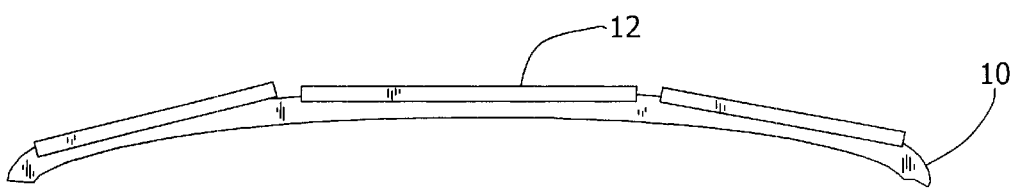
Figure 5:
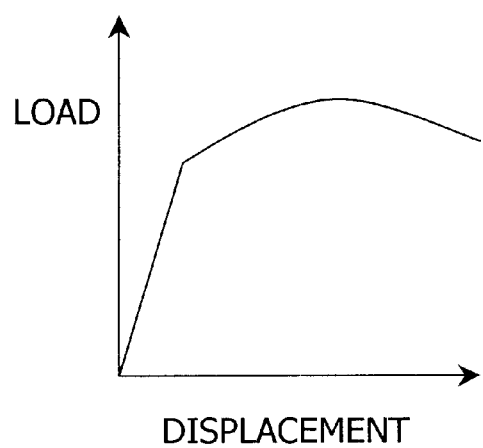
FIGS. 5 and 6 are graphs generated in evaluating test specimens of the invention in comparison to test specimens not of the invention.
Figure 6:
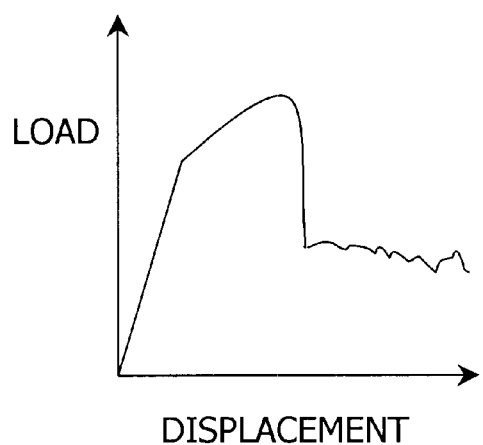

Successful processing is therefore dependent on the interaction of the surface roughening, cleaning, material selection, thermal spray parameters, and heat treatment selections. These aspects are selected to achieve transfer of loads on the component through the coating to the substrate. Most mechanical tests to evaluate process alternatives are ineffective due to required specimen geometry and the difficulty in interpreting results where partial bonding may occur. Bend testing is the preferred method of evaluating alternative processes and process combinations. FIG. 1 is a schematic drawing (top view and side view) of a bend test specimen used in accordance with this invention, prior to coating. FIG. 2 is a schematic drawing of the same specimen after coating. Coating 12 is applied to substrate 10 using proposed parameters. Three or four point bend testing is performed on coated substrates with the coated side in tension. The specimen is bent through an approximately one inch (2.5 cm) deflection, and a load versus displacement curve is obtained. Alternative process parameters are judged on the basis of their ability to withstand the bend test as evidenced by visual examination of the specimen and examination of the load versus displacement curve. Upon visual examination, specimens produced from acceptable parameters complete the bend test without evidence of cracking or separation of coating from the substrate, as shown in FIG. 3. Unacceptable parameters show cracking and/or lifting of the coating, per FIG. 4. In addition, upon examination of the load versus displacement curve, specimens produced from acceptable parameters show smooth curves with no sudden drop in load, as illustrated in FIG. 5. Unacceptable parameters show a load drop corresponding to cracking, per FIG. 6. Subsequent mechanical property testing confirmed that load transfer occurs using parameters that pass the bend test and does not occur in specimens that fail the bend test.

The backing material substrate to which the build up material is applied is typically formed from a Ni-based alloy such as IN718, René 41, IN625, Waspaloy or other common seal backing alloy. In one preferred embodiment of the invention, a honeycomb engine seal manufactured from IN718 is restored by a several step process. Remnant honeycomb is removed by conventional mechanical turning operations. The remaining seal backing is grit blasted with 40–120 grit aluminum oxide at 40–100 PSI pressure. The backing is cleaned with a high pressure water jet using a Progressive Technologies Robotic HPWJ Cleaning System at 30–50 KSI water pressure, 100–400 inches (2.54–10.16 meters) per minute surface velocity, 0.01 to 0.5 inch (0.025 to 1.3 cm) per minute feed rate, and 0.25 to 2.5 inch (0.64 to 6.4 cm) standoff distance. A nickel-based vacuum or inert gas atomized powder containing 4–8% Al and 15–22% Cr (weight percent) in the predominant size range of 10 to 50 microns is selected. The powder is sprayed onto the backing by HVOF deposition using a Jet Kote 2A gun, powder feed rates of 20–50 grams per minute, standoff distance of 6–15 inches (15–38 cm), 6–15 inch (15–38 cm) barrel length, and from between 2.5:1 and 4:1 fuel-to-oxygen flow ratios. The component is post-coating diffusion heat treated in a vacuum or inert environment at 1750–1975 degrees F. (954–1079 degrees C.) for from about 4 to about 48 hours.

A variety of alternative embodiments include use of this technique to restore other hardware features such as flanges and casing pockets, alternate grit media and parameters, alternate surface roughening methods, alternate buildup materials such as blends of parent metal chemistry and variations of Ni—Cr—Al compositions, alternate HVOF guns and associated parameters, alternate high pressure water jet machines and associated parameters, and higher temperature heat treatments (where base metal integrity can be maintained, for example, where the base material is IN718 castings or IN625, Hastelloy X, René 41, René 108, Mar M 247, Waspaloy, etc alloys). Additionally, alternate materials such as IN903, IN907 and IN909 can be processed similarly to IN718 wrought hardware.

The invention, therefore, achieves thickness restoration with a material deposited so as to withstand thermal and mechanical loads, which facilitates its usefulness for this purpose. The deposited material advantageously transmits stress and strain through the coating and into the base metal. The need for drastic densification processes such as HIP processing is avoided. The invention employs characteristics of interface cleanliness, coating material selection, and thermal spray parameters that permit bonding at diffusion heat treatment temperatures low enough to advantageously avoid excessive grain growth in wrought base material.

Another alternative to deposition by an HVOF process is the use of low pressure plasma spray (LPPS) for restoring honeycomb backing thickness. The LPPS process is conducted in a low pressure, protective environment, and produces a sound coating which is low in oxide content. The LPPS process is less preferred than the HVOF process in view of the reduced tendency for substrate distortion with the HVOF process.

As various changes could be made in the above methods without departing from the scope of the invention, it is intended that all matter contained in the above description shall be interpreted as illustrative and not in a limiting sense.

What is claimed is:

1. A method for repairing a high-load bearing gas turbine engine component comprising honeycomb structure on a backing substrate, the method comprising:
   removing the honeycomb structure from the backing substrate; and
   depositing a build-up material onto the backing substrate by high velocity oxy-fuel deposition.

2. The method of claim 1 comprising a fuel-to-oxygen ratio of at least about 2.5:1.

3. The method of claim 1 comprising a fuel to oxygen ratio of from about 2.5:1 and about 4:1.

4. The method of claim 1 comprising heat treating the backing substrate after the step of depositing build-up material.

5. The method of claim 1 comprising roughening the substrate prior to the step of depositing build-up material.

6. The method of claim 1 wherein the build-up material comprises a Ni-based alloy comprising from about 4 to about 8 wt % Al and from about 15 to about 22 wt % Cr.

7. The method of claim 1 wherein the build-up material comprises a mixture of alloy matching the composition of the substrate and a Ni—Cr—Al alloy.

8. A method for repairing a high-load bearing gas turbine engine component comprising honeycomb structure on a backing substrate, the method comprising:
   removing the honeycomb structure from the backing substrate;
   depositing a build-up material comprising from about 4 to about 8 wt % Al, from about 15 to about 22 wt % Cr, and balance Ni onto the backing substrate by a method selected from high velocity oxy-fuel deposition and low pressure plasma spray; and
   heat treating the backing substrate to diffuse deposited build-up material into the substrate and to enhance bond strength between deposited build-up material and the substrate.

9. A method for repairing a high-load bearing gas turbine engine component comprising honeycomb structure on a backing substrate, the method comprising:
   removing the honeycomb structure from the backing substrate;
   depositing a build-up material onto the substrate by high velocity oxy-fuel deposition employing a fuel-to-oxygen ratio which produces a reducing deposition atmosphere thereby reducing oxidation of build-up material during deposition.

10. A method for restoring thickness to a high-load-bearing gas turbine engine component, the method comprising:
    mechanically roughening a surface of the component to produce a roughened surface;
    cleaning the roughened surface to remove residue remaining from the mechanical roughening;
    depositing build-up material onto the roughened surface by a method selected from high velocity oxy-fuel deposition and low pressure plasma spray; and
    heat treating the component to diffuse deposited material into the substrate and enhance bond strength within the deposit and between deposited build-up material and the substrate.

11. A method for restoring thickness to a high-load bearing gas turbine engine component, the method comprising:
    removing unwanted remnant material from the substrate;
    roughening the substrate;
    cleaning the roughened substrate such that less than 10% embedded material remains;
    selecting a compatible powder material for deposition;
    depositing the selected material onto the substrate by a method selected from high velocity oxy-fuel deposition and low pressure plasma spray; and
    heat treating the component to diffuse deposited material into the substrate and enhance bond strength within the deposit and between deposited material and the substrate.

12. A method for repairing a high-load bearing gas turbine engine component comprising honeycomb structure on a backing substrate, the method comprising:

removing the honeycomb structure from the backing substrate;

roughening the backing substrate;

cleaning the backing substrate;

selecting a compatible powder material for deposition;

depositing the selected material onto the backing substrate by low pressure plasma spray deposition; and heat treating the backing substrate to diffuse deposited material into the substrate and enhance bond strength within the deposit and between deposited material and the substrate.

13. A method for repairing a high-load bearing gas turbine engine component comprising honeycomb structure on a backing substrate, the method comprising:

removing honeycomb structure from a continuous 3600 circular backing substrate;

roughening the backing substrate;

cleaning the backing substrate;

selecting a compatible powder material for deposition;

depositing the selected material onto the backing substrate by high velocity oxy-fuel deposition; and heat treating the backing substrate at a temperature selected to be sufficiently low to avoid significant grain growth and sufficiently high to diffuse deposited material into the substrate and enhance bond strength within the deposit and between deposited material and the substrate.

14. A method for restoring thickness to a high-load-bearing gas turbine engine component, the method comprising:

mechanically roughening a surface of the component to produce a roughened surface;

cleaning the roughened surface to remove residual embedded material from the mechanical roughening;

selecting a compatible powder material for deposition;

depositing the selected build-up material onto the roughened surface by a method selected from high velocity oxy-fuel deposition and low pressure plasma spray; and heat treating the component substrate to diffuse deposited build-up material into the substrate to enhance bond strength within the deposit and between deposited build-up material and the substrate.

15. The method of claim 1 wherein the build-up material is a ductile material having strong interparticle bonding properties and wherein the depositing is high-velocity oxy fuel deposition employing a fuel-to-oxygen ratio from about 2.5:1 to about 4:1.

16. The method of claim 8 wherein the build-up material is a ductile material having strong interparticle bonding properties and wherein the depositing is high-velocity oxy fuel deposition employing a fuel-to-oxygen ratio from about 2.5:1 to about 4:1.

17. The method of claim 9 wherein the build-up material is a ductile material having strong interparticle bonding properties and wherein the depositing is high-velocity oxy fuel deposition employing a fuel-to-oxygen ratio from about 2.5:1 to about 4:1.

18. The method of claim 10 wherein the build-up material is a ductile material having strong interparticle bonding properties and wherein the depositing is high-velocity oxy fuel deposition employing a fuel-to-oxygen ratio from about 2.5:1 to about 4:1.

19. The method of claim 11 wherein the powder material for deposition is a ductile material having strong interparticle bonding properties and wherein the depositing employs high-velocity oxy fuel deposition characterized by a fuel-to-oxygen ratio from about 2.5:1 to about 4:1.

20. The method of claim 12 wherein the powder material for deposition is a ductile material having strong interparticle bonding properties.

21. The method of claim 14 wherein the powder material for deposition is a ductile material having strong interparticle bonding properties and wherein the depositing employs high-velocity oxy fuel deposition characterized by a fuel-to-oxygen ratio from about 2.5:1 to about 4:1.

22. The method of claim 13 wherein the build-up material is a ductile material having strong interparticle bonding properties and wherein the depositing employs high-velocity oxy fuel deposition characterized by a fuel-to-oxygen ratio from about 2.5:1 to about 4:1.

* * * * *